Dec. 14, 1954     L. L. HUGHES     2,696,714
CARBURETING APPARATUS
Filed Sept. 25, 1950     4 Sheets-Sheet 1
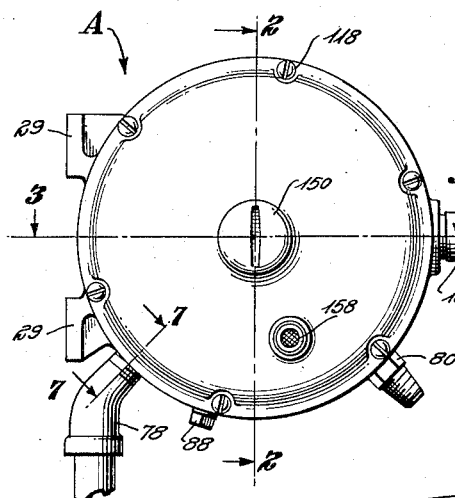
Fig. 1.
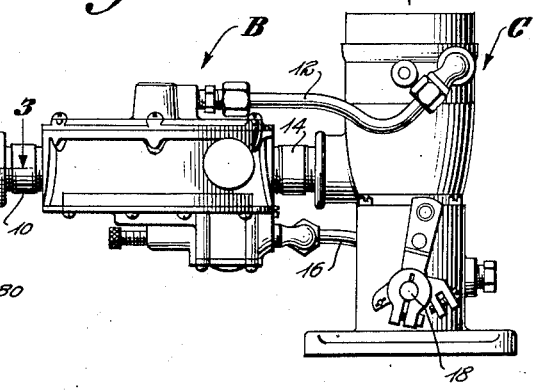
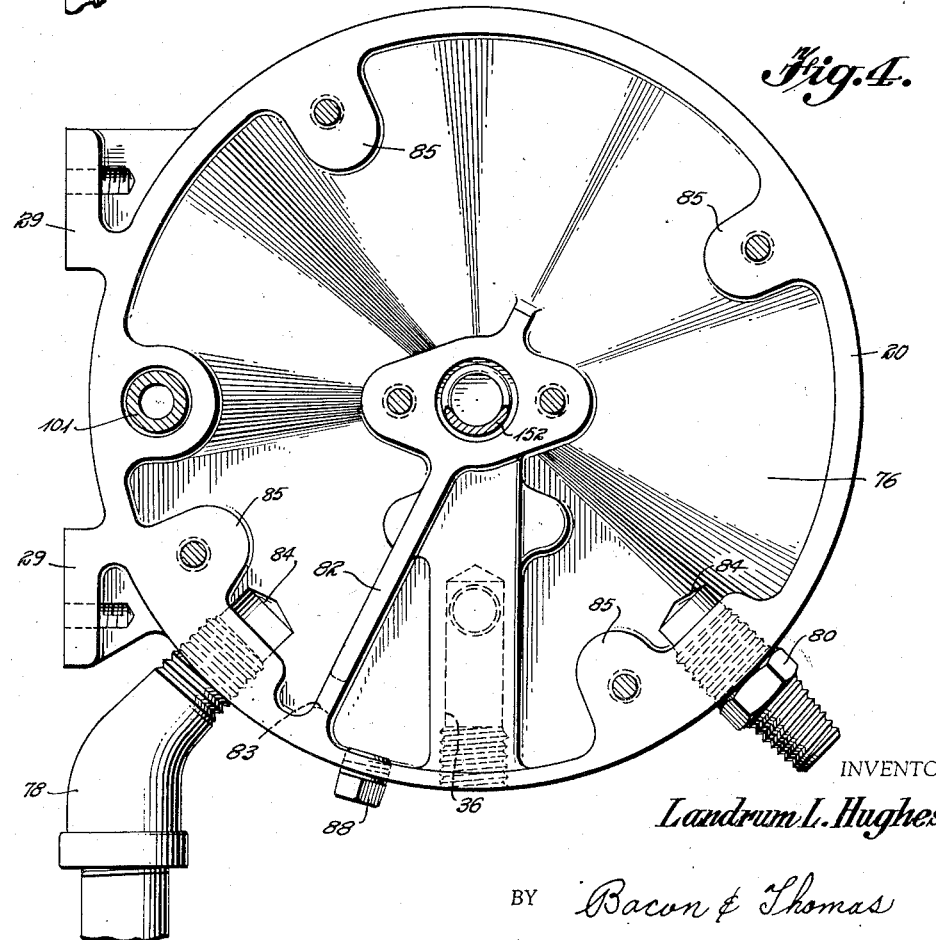
Fig. 4.
INVENTOR
*Landrum L. Hughes*
BY *Bacon & Thomas*
ATTORNEYS

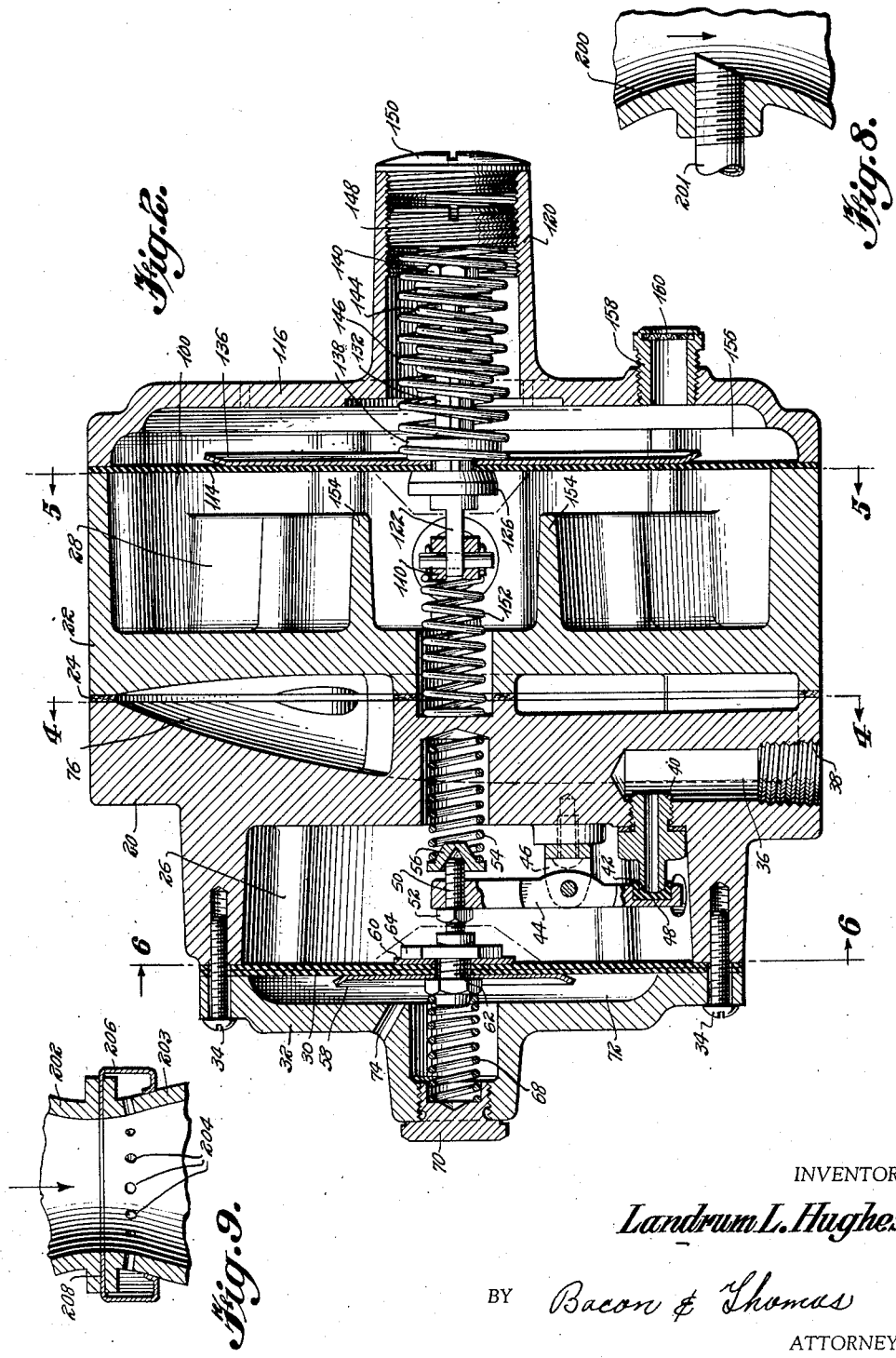

Dec. 14, 1954
L. L. HUGHES
2,696,714
CARBURETING APPARATUS
Filed Sept. 25, 1950
4 Sheets—Sheet 3
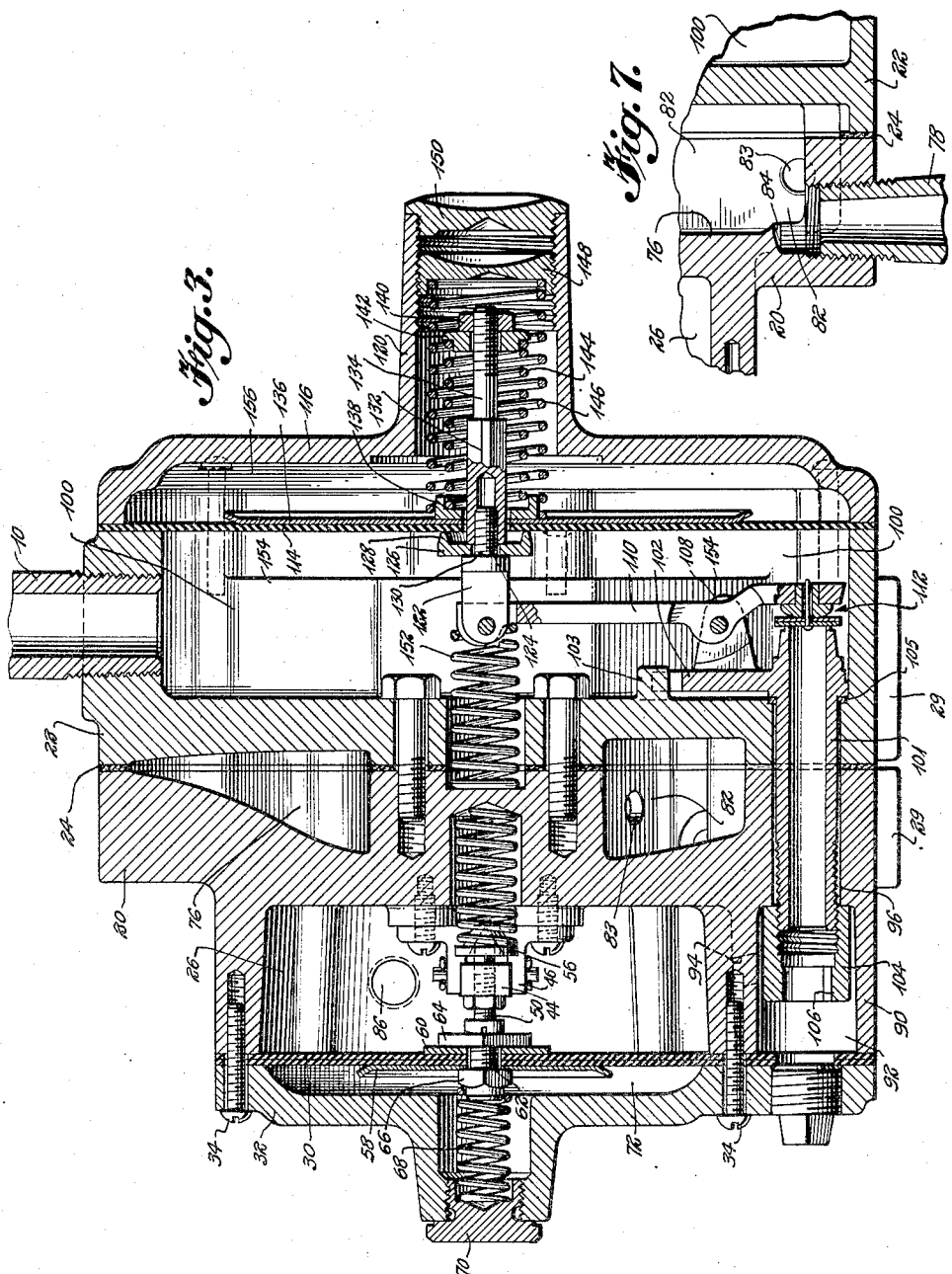
INVENTOR
Landrum L. Hughes
BY Bacon & Thomas
ATTORNEYS Dec. 14, 1954  L. L. HUGHES  2,696,714
CARBURETING APPARATUS
Filed Sept. 25, 1950  4 Sheets-Sheet 4

INVENTOR
Landrum L. Hughes
BY Bacon & Thomas
ATTORNEYS

United States Patent Office

2,696,714
Patented Dec. 14, 1954

2,696,714

CARBURETING APPARATUS

Landrum L. Hughes, Oklahoma City, Okla.

Application September 25, 1950, Serial No. 186,643

3 Claims. (Cl. 62—1)

This invention relates to carbureting apparatus for an internal combustion engine and particularly for the use of butane or propane fuels obtainable in liquid form. The invention has particular reference to a carbureting apparatus to adapt butane or propane fuels, or a mixture thereof, for use in aircraft although it finds utility in trucks, tractors, passenger automobiles and stationary engines.

Many attempts have heretofore been made to utilize liquid butane for the operation of aircraft engines but have not been successful. In the systems tried heretofore, apparatus was provided for vaporizing liquid butane and regulating the pressure of the vaporized fuel to not exceed atmospheric pressure. Such gas under atmospheric pressure was then drawn to the intake manifold of an internal combustion engine by the engine vacuum. In those prior attempts, increased demands of the engine for fuel resulted in an immediate increase in the rate of vaporization of the liquid fuel with the resultant high demand for heat and although attempts were made to supply the requisite heat to the liquid fuel, the systems were not successful. Another objection to the prior systems resides in the fact that aircraft engines must operate at different altitudes and also move from one altitude to another at a very rapid rate, thus changing the value of the atmospheric pressure effective on the regulating apparatus, and during a rapid descent, ambient atmospheric pressure on the apparatus increases at such a rapid rate that volatilization of liquid fuels did not occur sufficiently fast to supply the needs of the engine.

According to the present invention, apparatus is provided for volatilizing liquid butane or the like at a pressure of about five pounds per square inch. Fuel vapors under that pressure are connected to a second regulating mechanism to reduce the pressure to from three to eight ounces per square inch above atmospheric pressure. This second body of fuel vapor is available for use in the engine and is admitted thereto by a control valve system whereby the fuel is released to the engine in accordance with vacuum conditions existing in the engine manifold to thereby regulate the rate of release of fuel in accordance with the demands of the engine.

By maintaining a body of vaporized fuel at a pressure substantially above atmospheric, it is apparent that sudden demands for more fuel can be readily met since a substantial body of fuel has already been vaporized and the rate of vaporization in the first stage is not materially or suddenly increased but fluctuates rather gently. The control valve mechanism is effective to prevent leakage or loss of vaporized fuel during periods when the engine is not operating and the supply of fuel under pressure is maintained during those periods whereby it is readily available when it is desired to start the engine.

Novel means are provided for efficiently conducting heat from an operating engine to the vaporizing mechanism to thereby provide the necessary heat for vaporization.

It is therefore an object of this invention to provide apparatus for carburation whereby liquid butane fuel may be employed in an internal combustion engine and particularly in aircraft or trucks.

It is a further object of this invention to provide such a carbureting apparatus to supply fuel to an internal combustion engine in accordance with its needs independently of changes in ambient atmospheric pressure.

It is another object of this invention to provide a gas carbureting apparatus wherein heat is supplied thereto for vaporization of liquid fuel in an efficient and satisfactory manner.

It is a still further object of this invention to provide a gas carbureting apparatus safe in operation at all times and under all conditions.

Further objects and advantages will become apparent to those skilled in the art as the description proceeds in accordance with the accompanying drawings, wherein Figure 1 is a view of a carbureting assembly shown connected to a portion of the intake system of an engine;

Figure 2 is a sectional view through the vaporizing and regulating means, taken substantially on the line 2—2 of Figure 1;

Figure 3 is a view similar to Figure 2 but taken at right angles thereto along the line 3—3 of Figure 1;

Figure 4 is a sectional view taken along the line 4—4 of Figure 2;

Figure 7 is a fragmentary sectional view taken substantially along the line 7—7 of Figure 1; and Figures 8 and 9 are fragmentary sectional views illustrating alternative ways of admitting fuel to the Venturi restriction of a carburetor or mixer.

Figure 5:
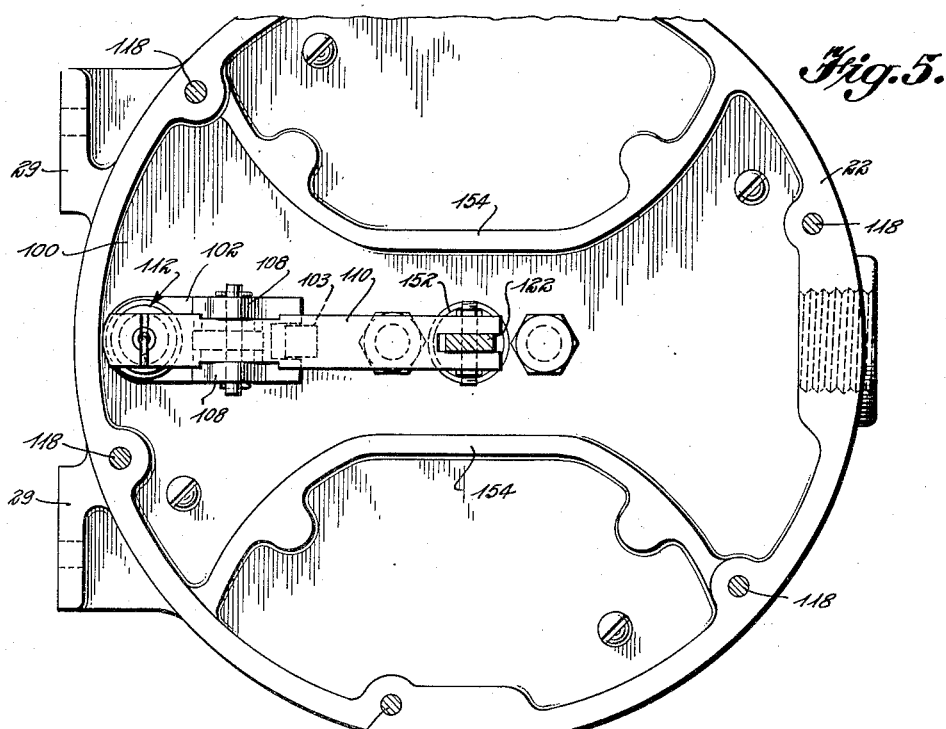
Figure 5 is a sectional view taken along the line 5—5 of Figure 2.

Referring now to Figure 1, there is shown a vaporizing and pressure regulating unit A, a fuel feed control unit B and a mixing or carbureting portion of an intake manifold C for an internal combustion engine. A supply of liquid fuel, such as butane, propane, or a mixture thereof, is conducted into the unit A wherein it is vaporized in one chamber to a gaseous state and maintained at a pressure of about five pounds per square inch. The gaseous fuel under that pressure is admitted, by regulating means, into a second chamber in the unit A where its pressure is regulated to a value of about six ounces per square inch although the pressure therein may be maintained at any value from three to eight ounces per square inch. A nipple 10 provides a passageway from the second chamber referred to to the control valve unit B. The control valve unit is connected by conduits 12, 14 and 16 to the intake manifold or carburetor of an internal combustion engine and comprises control valves responsive to pressure conditions in the carburetor to admit fuel from the unit A to the manifold C at a rate determined by the vacuum conditions in the latter. In general, the conduit 12 is connected to the air intake system at the intake end thereof and is subject to substantially atmospheric pressure at all times. The conduit or nipple 14 communicates with the throat of the usual Venturi restriction of the carburetor or mixer while the conduit 16 communicates with the manifold adjacent the throttle valve 18 and communicates with the manifold on the engine side of the throttle. The conduits 12, 14 and 16 may be rigid piping or flexible hose or tubing.

In the embodiment shown in Figure 1, air passes through the manifold C in the direction of the arrow, that is, from top to bottom. The mechanism within the control unit B comprises a main valve to admit fuel from the unit A through the conduits 10 and 14 to the manifold. The control valve referred to is responsive to relative vacuum conditions existing in the conduits 12, 14 and 16, respectively, and the valve is opened an amount proportional to the fuel demands of the engine, thus fuel vapor under a pressure of six ounces per square inch in the unit A is free to flow through the control unit to the manifold at a rate proportional to the opening of the main valve in control unit B.

The details of construction of control unit B constitute no part of the present invention and are fully and adequately described in the patent to S. P. Jones, No. 2,346,762. Reference to that patent's disclosure will indicate the structure and mode of operation of the control unit B and no further description thereof will be made here.

Since a body of available fuel is maintained at six ounces pressure in unit A, it will be readily apparent that a sudden release of a portion of that fuel to the manifold in response to an engine demand will merely momentarily reduce the pressure in the regulating chamber of unit A without immediately increasing the rate of vaporization from the liquid state. The regulating portion of unit A may then draw on the vapors maintained at five pounds pressure and the latter body of fuel must be materially depleted before a rapid rate of vaporization from the liquid state is necessary.

Referring now particularly to Figures 2 and 3 of the drawings, the unit A comprises a body portion 20 and a body portion 22 joined together along a common face at 24. The numeral 24 is employed to represent a gasket interposed between the body portions 20 and 22. The body portion 20 is configured to define a vaporizing chamber 26 in its outer face and the body portion 22 is configured to define a pressure regulating chamber 28 in its outer face. Body portions 20 and 22 may be provided with feet or brackets 29 by which unit A may be mounted on a suitable support.

The vaporizing chamber 26 of body portion 20 is closed by a diaphragm 30 which may comprise a single flexible sheet-like member or which may be a double sheet member as shown. The diaphragm 30 is clamped to the peripheral edge of the chamber 26 by means of a cap 32 and suitable screws 34. The chamber 26 is defined by the body portion 20 and the diaphragm 30. A passageway 36 is formed in the body portion 20 and defines a conductor from the exterior of the unit to the interior of the chamber 26. The passageway 36 may be provided with suitable threads 38 for connection with a pipe fitting or the like establishing communication with a tank or other supply of the desired liquid fuel. A fitting 40 having a passageway therethrough establishes communication between the passageway 36 and the chamber 26 and is provided with a beveled end portion 42 defining a valve seat.

A valve lever 44, pivoted to a yoke 46 fixed to the body member 20, carries a suitable valving material, preferably resilient, at 48 in position to engage and seal the end 42 of fitting 40. The valve member 44—48 thus constitutes a means to admit liquid fuel into the chamber 26 or to prevent flow of said fuel thereinto. The uppermost end of the valve lever 44 carries an adjustable screw 50 therethrough and a lock nut 52 to lock the screw 50 in adjusted position. A spring 54 abuts the bottom of a recess in housing member 20 and engages a floating element 56 which in turn bears on one end of screw 50. It will be readily apparent that the spring 54 urges the valve 48 to closed position.

A backing plate 58 is positioned adjacent one side of the diaphragm 30 and a clamping plate 60 is positioned adjacent the other side. The diaphragm 30 and the plates 58 and 60 are provided with aligned openings receiving a bolt 62 having a head 64 engaging the plate 60, and a nut 66 at its outer end to clamp the plates and diaphragm in assembled relationship. The head 64 of bolt 62 abuts the head of bolt 50 previously described and a spring 68 bears against the nut 66. The spring 68 reacts against a plug member 70 threadedly received in the cap 32 and it will be readily apparent that the spring 68 opposes closing movement of the valve 48. The cap 32 is so formed as to provide a space 72 at the outer face of the diaphragm 30. A vent opening 74 establishes communication between the space 72 and the atmosphere.

The relative strength of the springs 54 and 68 and the area of the diaphragm 30 are such that a vapor pressure of about five pounds per square inch in the chamber 26 plus the force of spring 54 will be sufficient to overcome the force of spring 68 and atmospheric pressure on the outer face of the diaphragm 30 to move valve 48 to closed position. When the vapor pressure in chamber 26 drops below that value, the pressure of the atmosphere on the outer face of diaphragm 30 plus the force of spring 68 will be sufficient to overcome the spring 54 and the reduced vapor pressure in the chamber to open the valve 48 and admit liquid fuel into the chamber. It will thus be apparent that as long as a supply of liquid fuel is available in the passage 36 at a sufficient pressure, it will be admitted to the chamber 26 in sufficient quantities to maintain a vapor pressure therein of five pounds per square inch or whatever other value the apparatus is designed or adjusted for. By adjustment of the screw 50 through the end of lever 44, the pressure maintained in the chamber may be regulated to any desired value, within limits.

The body members 20 and 22 previously described are provided with recesses in their adjoining faces which together define a chamber 76. The chamber 76 constitutes a circulating passageway for a heating medium whereby heat may be supplied to the material of the body members 20 and 22 to be conducted to the chamber 26 to supply the necessary heat for vaporization of the liquid fuels. The body members 20 and 22 are preferably made of material having good heat conducting characteristics, such as aluminum or the like.

Figure 4, taken with Figures 2 and 3, shows the general shape of the chamber for circulation of the heating medium. A fitting 78 received in an opening in body member 20 defines an inlet for the heating medium and communicates with the interior of the chamber 76. A second fitting 80 constitutes a discharge passageway from the chamber 76. The chamber 76 is of generally wedge-shaped configuration with its widest portion at the bottom adjacent the fittings 78 and 80. As clearly seen in Figures 2 and 3, the chamber 76 tapers upwardly and is relatively narrow at its uppermost portion. A suitable baffle or partition wall 82 (see Fig. 4) extends from the lowermost portion of the chamber 76 generally upwardly to about the mid portion thereof and separates the bottom of the chamber into an inlet and discharge portion. The passageway 36, previously described, is formed in the body member 20 to extend upwardly through a portion of the chamber 76 as shown in Figure 4, adjacent the baffle or partition 82. An opening 83 may be provided in partition 82 for a purpose to be described later. No other partitions other than 82 are present in the chamber 76 so there is substantially unimpeded flow of the heating medium from the fitting 78 around the chamber to the fitting 80. Since the uppermost portion of the chamber is relatively narrow, it will be apparent that the heating medium will attain a rather high velocity in that portion of the chamber and a large proportion of the medium will come into direct contact with the walls of the chamber. Referring now to Figure 7, it will be seen that the opening in which fitting 78 is received does not open cleanly into the chamber 76 but is at least partially obstructed by the wall of the chamber. In drilling the opening to receive the fitting 78, a burr 84 customarily is left. This burr is not removed but is permitted to remain as a part of the body member 20 and acts to cause high turbulence in the heating medium entering the chamber. Other projections 85 in chamber 76 (Fig. 4) also cause turbulence in the heating medium. The high turbulence of the heating medium during its movement through the chamber 76 is desirable since it brings a great proportion of the fluid into direct intimate contact with the walls of the chamber 76 to thereby increase the efficiency of heat transfer to the body members 20 and 22.

The chambers 26 and 76 may be provided with suitable drain plugs 86 and 88 respectively, whereby they may be drained of any fluids therein when desired.

Figure 6:
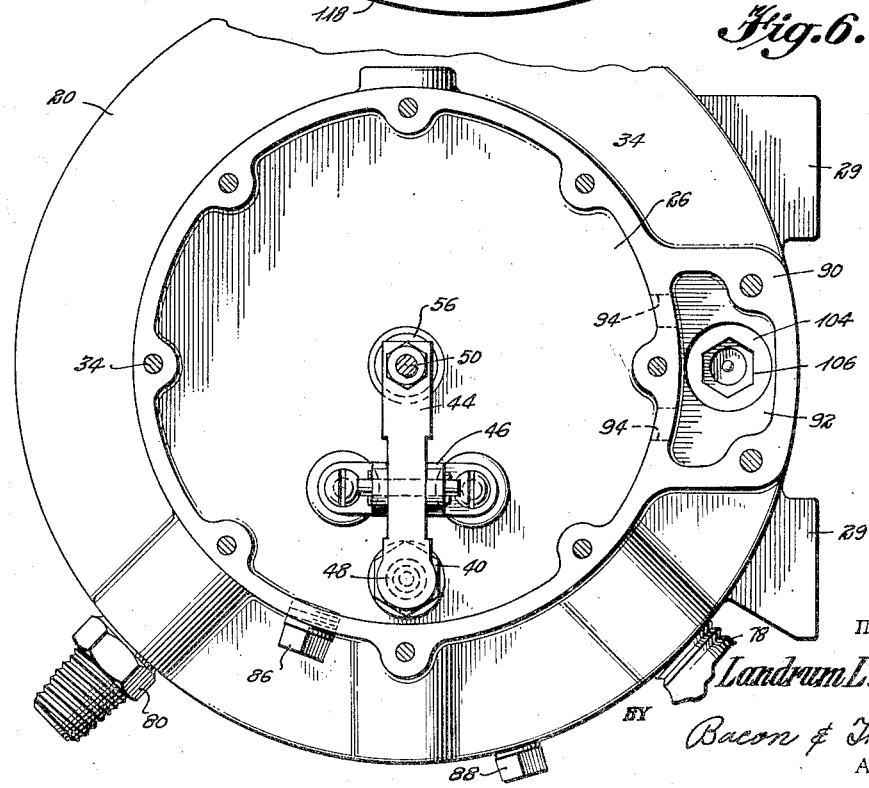
Figure 6 is a sectional view taken along the line 6—6 of Figure 2.

Referring now to Figures 3 and 6, the body member 20 is so formed as to provide a radially extending boss 90 provided with a chamber 92 therein and openings 94 establish communication between the chamber 92 and the chamber 26 previously described. A passageway or opening 96 extends from the chamber 92 through the face of body member 20 adjacent body member 22 and through the body member 22 into a chamber 100 formed therein. A transfer tube 101 extends through the opening 96 and is provided with a head portion 102 in the chamber 100. The head portion 102 is forked to engage a projection 103 on body member 22 to prevent rotation of the transfer tube 101 upon tightening of a hollow nut 104 in chamber 92. The hollow nut 104 acts to clamp the head 102 of transfer tube 101 against the inner face of the chamber 100, with a gasket 105 therebetween, and to assist in holding the body members 20 and 22 in assembled relationship. The nut 104 may be provided with a hexagonal socket 106 to receive a suitable wrench for installation or removal thereof. It will be readily apparent that vapors in the chamber 26 may enter the chamber 92 through openings 94 and pass therefrom through the transfer tube 101 into chamber 100. As shown in Figure 6, the chamber 92 and transfer tube 101 extend axially of the apparatus at a point above the bottom of the chamber 26, whereby any liquid fuel resting in the bottom portion of chamber 26 will not pass through the transfer tube to chamber 100.

The head 102 of transfer tube 101 is provided with upstanding ears or lugs 108 between which a valve lever 110 is pivoted. The valve lever 110 carries a suitable valve element 112 in position to engage and seal the end of transfer tube 101.

The chamber 100 is defined in part by a recess in the outermost face of body member 22 and in part by a flexible diaphragm 114 clamped to the peripheral edge of the body member 22 by a suitable cap plate 116 and screws 118 (see Figure 1). The cap plate 116 is provided with an outwardly extending hollow boss 120 having internal threads therein at its outer end. The innermost end of the lever 110 is forked and receives and is pivoted to member 122 which has a reduced threaded end portion 124. A safety valve cup 126 having a peripheral edge 128 defining a valve seat also has an opening to receive the threaded end 124 of yoke 122 and abuts against a shoulder 130 on member 122. A rod 132, preferably substantially square in section, is internally threaded at one end to receive the reduced threaded portion 124 of member 122 and abuts against the interior face of safety valve element 126 to clamp the latter against the shoulder 130. The rod 132 is provided with a threaded end portion 134. The diaphragm 114 is supported by a backing plate 136 and aligned openings in the diaphragm and backing plate loosely receive the rod 132. The openings in the diaphragm 114 and plate 136 are preferably round to provide a space between the edges of those openings and the rod 132. A cup member 138 loosely abuts the outer face of plate 136 and is also provided with a round opening through which rod 132 passes. A nut 140 threaded to the outer end of the rod 132 and a washer 142 confine a compression spring 144 between the washer 142 and the cup member 138. It will be clear that the spring 144 will act to press the safety valve element 126 into sealing engagement with the innermost face of diaphragm 114 and under normal conditions this assembly operates as a single rigid unit. A compression spring 146 abuts the plate 136 and extends outwardly into the hollow boss 120 into engagement with an adjusting member 148 threadedly engaged with the internal threads of the boss 120. By adjustment of the member 148 in boss 120, the compression of spring 146 may be adjusted. A dust cap 150 may be provided to close the outermost end of the boss 120 and prevent inadvertent adjustment of member 148 while making the latter readily accessible when adjustment is desired. A further compression spring 152 engages the innermost end of valve lever 110 and abuts the bottom of a recess extending through body member 22 into body member 20.

The nipple 10, described in connection with Figure 1, communicates with the interior of the chamber 100 and constitutes a discharge means to lead fuel vapor into the control unit B. Clearly, a flexible tube or other conduit may be employed. The chamber 100 is further provided with axially extending ribs 154 (see Fig. 5) terminating inwardly of the diaphragm 114. The ribs 154 are provided for the purpose of preventing complete inward collapse of the diaphragm 114 under adverse pressure conditions. Inward movement of the diaphragm is permitted to the extent necessary for normal pressure regulating operation but is prevented beyond a safe excess of those limits by the ribs 154.

It will be clear from the above description that vaporized fuel in the chamber 26, under a pressure of about five pounds per square inch will be automatically and periodically released by the valve 110—112 into chamber 100 at a pressure of about six ounces per square inch when the member 148 is properly adjusted. The magnitude of the pressure maintained in chamber 100 is regulated by adjusting the compression of spring 146 through the medium of member 148.

In the event unduly high pressures exist in the chamber 100, the diaphragm 114 will be forced outwardly to the right as seen in Figure 3 against the action of spring 146. The valve 112 will be closed at that time so the upper end of lever 110 and the member 122 and rod 132 cannot follow the diaphragm to the right. Under these conditions, the diaphragm 114 and plate 136, in moving to the right, will compress spring 144 and the diaphragm will move away from the peripheral edge 128 of the safety valve element 126, thus permitting the high pressure in chamber 100 to vent itself through the openings in the diaphragm 114 and plate 136 into the space 156 between cover plate 116 and the diaphragm 114. The space 156 is vented to the atmosphere through a suitable fitting 158 (Figure 2) which may be provided with a screen 160 to prevent entry of foreign matter into the regulator unit. The pressure in chamber 100 must exceed that for which the parts are adjusted by the amount necessary to compress spring 144 before the safety valve feature described comes into operation. By adjustment of nut 140, that amount may be regulated and predetermined.

The safety valve feature described above finds particular utility in such an apparatus when the final pressure stage, as here (in chamber 100), is super-atmospheric. During periods when the engine is shut down and there is no demand for fuel, and when ambient temperatures are sufficiently low, the fuel vapors in chamber 100 may condense to liquid form and form a pool in the bottom portion of chamber 100. Such condensation results in lowering the pressure in chamber 100, thus admitting more vapor from the chamber 26. When, after such a period of shutdown, the engine is again started, there is sufficient fuel gas under pressure in the chamber 100 to effect starting the engine and a heating medium starts to flow through chamber 76 to provide heat to the vaporizing unit. Some of the heat provided by the circulating medium will be absorbed by the walls of chamber 100 and transmitted to the liquefied fuel therein, thus tending to increase the pressure in chamber 100 quite rapidly. The increase in pressure due to vaporization of liquid in regulating chamber 100 may reach unsafe proportions quite rapidly and the safety valve described above will vent such pressure to atmosphere, preventing damage to the apparatus.

The heating medium may be circulated from the engine itself and may constitute a portion of the coolant for the engine or may be lubricating oil, particularly in the case of aircraft application. In any event, the fluid medium is pumped from the engine at the point where it first begins to absorb heat to thus transfer heat to the liquid fuel in the shortest possible time. Forced circulation through the chamber 76 is preferred and it has been found that sufficient heat will commence to be supplied to the vaporizer after a very few explosions in the cylinders of the internal combustion engine. The opening 83 in baffle 82 permits at least some of the first warm fluid to pass directly from fitting 78 to the enlargement housing passageway 36 to pre-warm liquid fuel entering the unit. A relatively large quantity of heat is required to vaporize the fuel necessary for operation of an engine and in transferring that heat to the vaporizer, the apparatus of the invention provides an efficient means for cooling the lubricating oil of aircraft engines and has been found to cool such oil from 15 to 20 degrees.

As stated previously, the apparatus and method of the present invention establishes a body of vaporized fuel (in chamber 100) at a pressure substantially above atmospheric pressure, thus making immediately available a supply of fuel to accommodate sudden increases in engine demand without the necessity of practically instantaneously and rapidly evaporating additional liquid fuel with the attendant danger of "freezing" the apparatus. Thus, a relatively constant flow of heat will be adequate to supply fluctuating fuel demands. The "demand" for fuel is determined by engine speed and throttle valve opening, which affect the relative vacuum in conduits 12, 14 and 16. An apparatus according to the present invention has been successfully operated in aircraft and it was found that no additional adjustments were necessary upon rapid and great changes in altitude.

Since the fuel vapors in chamber 100 are maintained under pressure, the vacuum in the intake manifold of an engine being operated does not alter the pressure conditions in that chamber. The control valve unit B merely releases fuel to the manifold and flow through the unit B is caused by the pressure in chamber 100 rather than by the suction of the manifold. It has been found that the combination shown in Figure 1 provides a carbureting system that does not require adjustments for opertaing under different atmospheric conditions and will at all times supply the requisite proportion of fuel to the engine during periods of fluctuating demand. The apparatus described maintains substantially the preset pressure in chamber 100 at all times, even during maximum withdrawal of fuel.

The apparatus and method of the present invention may readily be adapted to engines having conventional carburetors as unit C or may be adapted to engines having vapor "mixers" at that point. It is also contemplated that the present apparatus and method may be added to conventional liquid fuel carbureting systems with suitable controls to enable the operator to switch, at will, to butane-propane operation or to gasoline operation. Such an installation has been successfully made in a passenger automobile.

Such an installation may include a solenoid-operated valve in the gasoline supply line leading to the carburetor and another in the supply line leading to the unit A. A double-throw switch, readily accessible to the operator, may be employed to permit switching from one fuel supply system to the other at will. Such a switch would act to open one of the solenoid-operated valves while closing the other to enable instant selection of the fuel to be used without stopping the engine or vehicle. It is also contemplated that at least the valve controlling flow of butane to unit A be in the ignition circuit of the engine to insure blocking flow of fuel to unit A during idle periods, thus constituting an additional safety feature.

Figures 8 and 9 illustrate alternative arrangements for admitting the vaporized fuel into the carburetor or mixer at the Venturi restriction. In Figure 8, numeral 200 represents the side walls of the Venturi passageway and numeral 201 indicates a conduit or pipe, corresponding to the nipple 14 of Figure 1, for admitting fuel thereto under normal operating conditions. It has been found that if the conduit 201 were extended into the center of the Venturi throat and directed in the direction of air flow, as is customary, the passageway would be obstructed to such an extent and the air velocity thereby increased to such a degree that too much fuel would be admitted. This is particularly true since the fuel is forced into the carburetor by the pressure existing in chamber 100 of unit A. As shown in Figure 8, the conduit 201 extends only a very short distance into the Venturi restriction and its innermost end is cut on a bevel facing away from the direction of air flow indicated by the arrow. It has been found that this arrangement produces exactly the correct air conditions to admit the desired quantity of fuel under any given rate of flow of air into the engine. The arrangement is such that during high vacuum conditions there will not be a great enough reduction in pressure in the conduit 201 to draw a substantial vacuum in the fuel feeding mechanism. It is to be remembered that the control valve unit B is controlled at least in part by the vacuum conditions existing in the conduit or tube 201 and the relationship between the pressure therein and the demands of the engine must be very carefully regulated.

As an alternative to the arrangement shown in Figure 8, Figure 9 illustrates a manner of admitting fuel into a carburetor or mixer of standard construction but made of two parts 202 and 203 assembled at a joint at the Venturi restriction. Clearly the arrangement shown in Figure 8 cannot be readily adapted to the construction of Figure 9 but it has been found that the same results may be obtained by providing a plurality of circumferentially spaced fuel admitting openings 204 immediately below the Venturi restriction so that their innermost ends face partially in the direction of air flow. Each orifice thus has an "overhang" on the upstream side to accomplish the same results as the beveled end portion of conduit 201 of Figure 8. Fuel may be admitted to the openings 204 by means of a jacket or manifold 206 held in any suitable manner about the carburetor portion 203. As shown, the jacket or manifold 206 may be provided with a suitable flange 208 to be received between the opposed face portions of members 202 and 203. Such a manifold may be made in two parts, each comprising a substantially semi-circular structure for ease of assembly to the carburetor body portions and any suitable fixture may be employed to admit fuel to the space within the manifold 206.

While a single species embodiment of the vaporizing and pressure regulating means has been shown and described herein, it is to be understood that such description is merely illustrative and the invention is not to be limited thereto, the scope of the invention being determined by the appended claims and being of sufficient breadth to encompass all modifications falling within the terms of the claims.

I claim:

1. In a gas carbureting apparatus, a liquid fuel vaporizing and pressure regulating means comprising, a housing assembly of two parts having abutting faces joined along a common plane, said parts having complementary recesses in their abutting faces defining a flow path for a heating medium, a vaporizing chamber in one of said parts and a pressure regulating chamber in the other of said parts, a tubular conduit extending across said common plane and establishing communication between said chambers, said tubular conduit passing through said abutting faces outside the space constituting said recess defining said flow path.

2. In a gas carbureting apparatus, means defining a liquid fuel vaporizing chamber, means defining a heating chamber in heat conductive relation to said vaporizing chamber, said heating chamber having generally circular opposed side walls converging inwardly, a partition in said heating chamber extending transversely of said side walls and from the side of said chamber having the greatest width to substantially the middle thereof, and two passageways communicating with said heating chamber adjacent the said side of greatest width and on opposite sides of said partition, said passageways comprising an inlet and an outlet for a heating medium.

3. An apparatus as defined in claim 2, including means at the juncture of the heating chamber and said inlet passageway for causing turbulence in a heating medium flowing therethrough.

References Cited in the file of this patent

UNITED STATES PATENTS

| Number | Name | Date |
| --- | --- | --- |
| 1,865,514 | Godward | July 5, 1932 |
| 2,073,276 | Ensign | Mar. 9, 1937 |
| 2,169,487 | Ensign | Aug. 15, 1939 |
| 2,248,222 | Ensign | July 8, 1941 |
| 2,272,341 | Holzapfel | Feb. 10, 1942 |
| 2,285,905 | Cunningham et al. | June 9, 1942 |
| 2,346,762 | Jones | Apr. 18, 1944 |
| 2,475,086 | Ensign | July 5, 1949 |
| 2,475,087 | Ensign et al. | July 5, 1949 |
| 2,541,419 | Holloway | Feb. 13, 1951 |
| 2,563,228 | Ensign | Aug. 7, 1951 |
| 2,565,816 | Jones | Aug. 28, 1951 |
| 2,636,814 | Armstrong et al. | Apr. 28, 1953 |

FOREIGN PATENTS

| Number | Country | Date |
| --- | --- | --- |
| 27,993 | Great Britain | 1904 |
| 697,438 | Germany | Oct. 14, 1940 |